May 22, 1934.                V. A. SCHOENBERG                 1,960,168
                      OIL TESTER USING RADIO FREQUENCY
                           Filed March 28, 1933
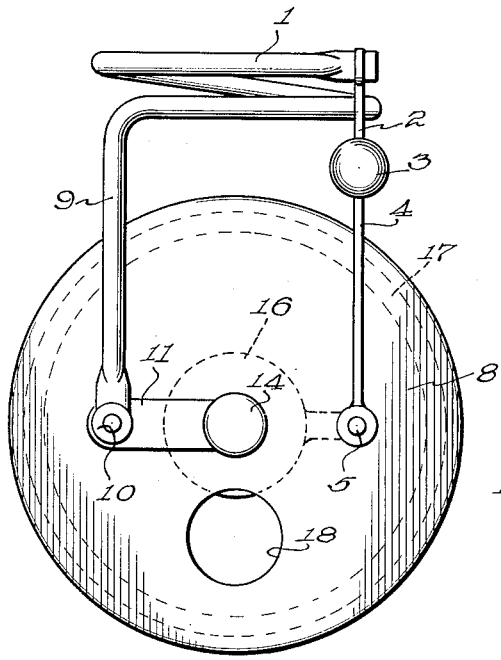
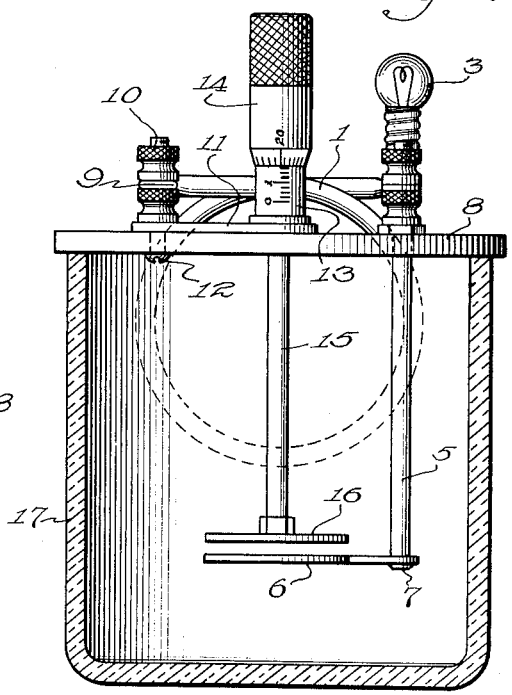
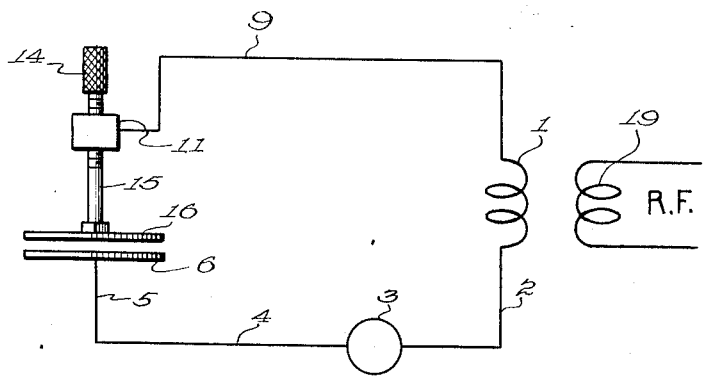
Witness
Arthur M. Franke
Inventor
Virgil A. Schoenberg.
by Rummler, Rummler & Woodworth
Attys.

Patented May 22, 1934

1,960,168

UNITED STATES PATENT OFFICE 1,960,168

OIL TESTER USING RADIO FREQUENCY

Virgil Adolf Schoenberg, Niles Center, Ill., assignor to Light Sensitive Apparatus Corporation, Niles Center, Ill., a corporation of Illinois Application March 28, 1933, Serial No. 663,230

9 Claims. (Cl. 175—183)

This invention relates to an improved method and means of measuring the contaminating content of lubricating oil.

The main objects of my invention are to provide a simple wave meter circuit to indicate the condition of oil placed in the circuit; to provide electrodes in the wave meter circuit to be immersed in an oil bath; to provide means for adjusting the distance between the electrodes; to provide accurate means for measuring the distance between the electrodes; and to provide a calibration indicating degrees of contamination of the oil.

Figure 1 is a top view of a wave meter.

Fig. 2 is a side view of the wave meter partly in section, showing the adjustable electrodes housed in an oil receptacle.

Fig. 3 is a diagrammatic sketch of the wave meter and transmitter coil.

My invention comprises a wave meter having an inductance coil 1 connected by lead 2 with an indicating lamp 3; thence by lead 4 to a supporting conductor 5 having a fixed horizontal electrode 6 secured thereto by a screw 7.

The conductor 5 passes through a plate 8 forming a base to support the wave meter. A lead 9 from the inductance coil 1 connects with a binding post 10 which is seated on a conducting strip 11 and is fastened to the base plate 8 by a screw 12. Fastened to the strip 11 is a graduated barrel 13 on which is a threaded graduated thimble 14 secured to a rod 15 on the bottom end of which is fastened a movable electrode 16.

The base plate 8 is adapted to form a cover for a glass receptacle 17 in which the electrodes 6 and 16 are housed. An aperture 18 in the cover plate 8 is provided for filling the receptacle without moving the cover.

A radio frequency transmitter coil 19 is arranged to propagate a wave length of approximately 3 to 3½ meters at very low voltage. Any standard oscillator, not shown, having suitable inductance and capacity is connected to the transmitter coil 19.

In operation the transmitter coil propagating a fixed wave length and the inductance coil of the wave meter are placed in close proximity to each other. The wave meter circuit is then tuned or adjusted to resonance by manipulation of the electrodes 6 and 16 toward or away from each other, which condition is observed by the operation of a small flash light bulb or any suitable current indicating device.

Resonance is first found by observing the maximum current in the wave meter with the electrodes or condenser plates surrounded by air. When resonance in air is obtained a micrometer reading is taken by observing the relative position of the barrel and thimble as shown by the graduations on both.

After the position of resonance is recorded, then enough oil is poured into the glass receptacle to immerse the electrodes completely. The presence of the oil changes the position of the electrodes at which resonance is obtained, which position is again determined by changing the distance between the electrodes, which are immersed in the oil, until the lamp again becomes operative. The change in the electrode spacing reading is observed to be proportional to the contaminating content of the oil between the electrodes. It therefore follows that the graduation of the barrel 13 can be arranged to read directly the degree of contamination of the oil or a conversion table prepared by which the readings on any scale can be converted to known oil values.

Owing to the fact that the radio frequency transmitter is operated at very low voltage, there is no danger in the manipulation of the device.

It is to be understood that some of the details set forth may be altered or omitted without departing from the spirit of the invention as defined by the following claims.

I claim:

1. An oil tester comprising a radio frequency transmitting coil, an inductance coil in loose coupled relationship with said transmitting coil, a current indicator, a pair of electrodes in circuit with said inductance coil and current indicator and arranged to be immersed in oil, means to support said electrodes, and means to move said electrodes toward and away from each other.

2. An oil tester comprising a radio frequency transmitting coil, an inductance coil in loose coupled relationship with said transmitting coil, a current indicator, a pair of spaced electrodes in circuit with said inductance coil and current indicator, a means arranged to support and carry said inductance coil, current indicator and electrodes, an oil receptacle arranged to receive said electrodes and on which said supporting means is mounted, and adjustable means to vary the spacing between said electrodes.

3. An oil tester comprising a radio frequency transmitting coil, an inductance coil in loose coupled relationship with said transmitting coil, a current indicator, a pair of spaced electrodes in circuit with said inductance coil and current indicator, supporting means arranged to carry said inductance coil, current indicator and electrodes, an oil receptacle arranged to receive said electrodes and on which said supporting means is mounted, and means for adjusting and measuring the distance between said electrodes.

4. An oil tester comprising a radio frequency transmitting coil, an inductance coil in loose coupled relationship with said transmitting coil, a current indicator, a pair of electrodes in circuit with said inductance coil and current indicator, a supporting means arranged to carry said inductance coil, current indicator and electrodes, an oil receptacle arranged to contain a quantity of oil to be tested and to receive said electrodes, said supporting means being arranged to be mounted on said receptacle, and said electrodes being arranged to be immersed in the oil, and means for adjusting and measuring the distance between said electrodes.

5. An oil tester comprising a radio frequency transmitting coil, an inductance coil arranged to be placed in loose coupled relation to said transmitting coil, a current indicator, a pair of electrodes in circuit with said inductance coil and current indicator, a supporting means on which said inductance coil, current indicator and electrodes are mounted, an oil receptacle arranged to contain a quantity of oil to be tested and to receive said electrodes, said supporting means being arranged to be mounted on and serve as a closure for said receptacle, and said electrodes being arranged to be immersed in the oil, and calibrated means for adjusting one of said electrodes toward and away from the other and for measuring the distance between said electrodes to determine the relative amount of contamination in the oil.

6. In an oil tester, a radio frequency transmitting coil, an inductance coil in loose coupled relation to said transmitting coil, a current indicator, a pair of electrodes in circuit with said inductance coil and current indicator, a supporting means arranged to hold said electrodes in spaced relation to each other, means to adjust said electrodes toward and away from each other, means for measuring the distance between said electrodes, and an oil receptacle adapted to receive said electrodes.

7. An oil tester comprising a receptacle arranged to receive a quantity of oil to be tested, a radio frequency transmitting coil, a wave meter comprising an inductance coil loosely coupled with said transmitting coil and connected in series with a current indicator and a pair of adjustable condenser electrodes, said electrodes being arranged to be housed in said receptacle and submerged in the oil therein, and means for measuring the distance between said electrodes for determining the contaminating content in the oil.

8. The method of determining the contaminating content of oil which consists in measuring the difference in the spacing of a pair of electrodes, in a wave meter circuit, required to produce resonance in said circuit when said electrodes are submerged successively in air and the oil to be tested.

9. The method of determining the contaminating content of oil which consists in producing resonance in a wave meter circuit comprising a pair of spaced electrodes when air is utilized as a dielectric between said electrodes, immersing said electrodes in the oil to be tested, adjusting said electrodes to re-establish resonance in said circuit, and measuring the change of spacing between said electrodes required to reestablish resonance.

VIRGIL ADOLF SCHOENBERG.